United States Patent
Fujita

(10) Patent No.: US 10,069,621 B2
(45) Date of Patent: Sep. 4, 2018

(54) OFFSET VALUE CORRECTION DEVICE AND OFFSET VALUE CORRECTION METHOD FOR CORRECTING OFFSET VALUE IN RECEIVED SIGNAL

(71) Applicant: JVC KENWOOD Corporation, Yokohama-shi, Kanagawa (JP)

(72) Inventor: Akiyoshi Fujita, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/386,531

(22) Filed: Dec. 21, 2016

(65) Prior Publication Data

US 2017/0187518 A1 Jun. 29, 2017

(30) Foreign Application Priority Data

Dec. 25, 2015 (JP) .................................. 2015-253729

(51) Int. Cl.
*H04L 7/04* (2006.01)

(52) U.S. Cl.
CPC ........ *H04L 7/042* (2013.01); *H04L 2007/047* (2013.01)

(58) Field of Classification Search
CPC .......................... H04L 7/042; H04L 2007/047
USPC ............................................................ 375/343
See application file for complete search history.

(56) References Cited

U.S. PATENT DOCUMENTS

2007/0121765 A1* 5/2007 Min .................. H04L 7/041
                                                             375/343
2007/0253471 A1* 11/2007 Wilhelmsson .......... G01S 19/29
                                                             375/150

FOREIGN PATENT DOCUMENTS

JP         2006-060725 A      3/2006

* cited by examiner

*Primary Examiner* — Michael Neff
(74) *Attorney, Agent, or Firm* — Brundidge & Stanger, P.C.

(57) ABSTRACT

A baseband filter unit inputs a received signal including a sine wave at least in a portion of the received signal. A differentiator differentiates the received signal. A first correlator correlates the received signal differentiated and a cosine waveform. An acquisition unit acquires a value of the received signal as an offset value, at a time estimated based on a result of correlation in the first correlator and at a time when the received signal includes a sine waveform. A correction unit corrects the received signal in accordance with the offset value acquired in the acquisition unit.

4 Claims, 8 Drawing Sheets

OFFSET VALUE CORRECTION DEVICE AND OFFSET VALUE CORRECTION METHOD FOR CORRECTING OFFSET VALUE IN RECEIVED SIGNAL

CROSS-REFERENCE TO RELATED APPLICATION

This application is based upon and claims the benefit of priority from the prior Japanese Patent Application No. 2015-253729, filed on Dec. 25, 2015, the entire contents of which are incorporated herein by reference.

BACKGROUND

1. Field

The present invention relates to offset value correction technologies and, more particularly, to offset value correction devices and offset value correction methods for correcting an offset value in a received signal.

2. Description of the Related Art

In digital communication, a transmitter transmits signal derived by subjecting a symbol to digital modulation. A receiver identifies a symbol in each symbol period by comparing a detected value and a reference symbol value. For generation of a transmitted symbol and detection of a received symbol, a reference value is required. Where Frequency Shift Keying (FSK) is employed for digital modulation, the reference value represents a reference frequency. A shift created between the reference frequency of a transmitter and the reference frequency of a receiver occurs as a Direct Current (DC) offset in a detection signal of the receiver and inhibits symbol detection in the receiver. To cancel a DC offset, a High-Pass Filter (HPF) is used by way of example to filter a DC component (see, for example, patent document 1).

[patent document 1] Japanese Patent Application Laid-open No. 2006-60725

In the case of digital modulation, a detection signal also includes a DC component. Therefore, use of a HPF to cancel a DC offset results in necessary information being lost. Loss of necessary information can cause permanent degradation. The larger the amount of DC offset, the longer it takes to cancel a DC component and the longer it takes to establish synchronization. As a result, it takes longer to receive data successfully.

SUMMARY

An offset value correction device according to an embodiment comprises: an input unit that inputs a received signal including a sine waveform at least in a portion of the received signal; a differentiator that differentiates the received signal input to the input unit; a correlator that correlates the received signal differentiated in the differentiator and a cosine waveform; an acquisition unit that acquires a value of the received signal input to the input unit as an offset value, at a time estimated based on a result correlation in the correlator and at a time when the received signal input to the input unit includes a sine waveform; and a correction unit that corrects the received signal input to the input unit in accordance with the offset value acquired in the acquisition unit.

Another embodiment relates an offset value correction method. The method comprises: inputting a received signal that includes a sine waveform at least in a portion of the received signal; differentiating the received signal; correlating the received signal differentiated and a cosine waveform; acquiring a value of the received signal as an offset value, at a time estimated based on a result of correlation and at a time when the received signal includes a sine waveform; and correcting the received signal in accordance with the offset value.

Optional combinations of the aforementioned constituting elements, and implementations of the embodiment n in the form of methods, apparatuses, systems, recording mediums, and computer programs may also be practiced as additional modes of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A-3C show a data structure of a synchronization word of FIG. 2;

DETAILED DESCRIPTION

The invention will now be described by reference to the preferred embodiments. This does not intend to limit the scope of the present invention, but to exemplify the invention.

A brief summary will be given before describing the invention in specific details. An embodiment relates to a communication system using a digital modulation scheme and comprised of a transmission device and a receiving device. By way of example, FSK is used for a digital modulation scheme and wireless communication is performed. As mentioned above, if the reference frequency of the transmission device and the reference frequency of the receiving device are shifted from each other, a DC offset will be included in a signal detected in the receiving device. In the presence of a DC offset, the reception characteristics become poor, requiring correction of a DC offset. Use of a HPF for correction of a DC offset results in poor precision of correction due to the lost information component and a longer period of time required for correction. The embodiment addresses these issues by performing the following steps.

The signal transmitted from the transmission device is formed as a frame signal such as a packet signal and a bust signal. A frame signal includes a synchronization word. A synchronization word represents information for establishing frame synchronization with the transmission device in the receiving device, and is known information. A sine wave is included at least in a portion of the synchronization word. The receiving device receives a frame signal from the transmission device and subjects the received signal to frequency detection and performs analog-to-digital conversion at a predetermined sampling rate. Further, the receiving device differentiates the digitized detection signal sample by sample. The differentiation transforms the sine waveform into a cosine waveform and the receiving device detects the cosine waveform in the detection signal.

When a cosine waveform is detected, the receiving device acquires the value of the detection occurring at a time when the sine waveform should pass the origin as a DC offset value. Further, the receiving device corrects the detection signal according to the DC offset value thus acquired. In this way, the receiving device differentiates the detection signal sample by sample. Therefore, the DC offset value is acquired and correction of the detection signal is enabled regardless of the amount of the DC offset. Differentiation of a sine waveform only results in a change in phase so that the detection signal is captured without causing a loss of information component.

Figure 1:
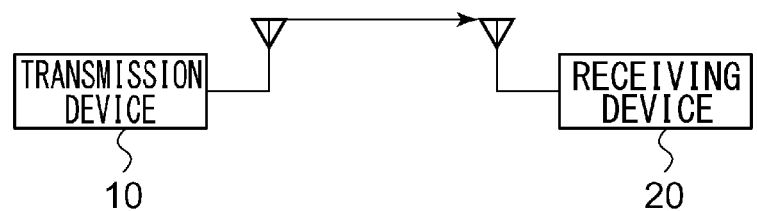
FIG. 1 shows a configuration of a communication system according to the embodiment.
Figure 2:
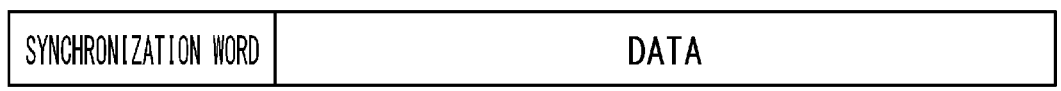
FIG. 2 shows a format of a signal transmitted from the transmission device of FIG. 1.

FIG. 1 shows a configuration of a communication system 100 according to the embodiment. The communication system 100 includes a transmission device 10 and a receiving device 20. The transmission device 10 is a wireless device adapted to perform digital modulation such as FSK. FIG. 2 shows a format of a signal (e.g., frame signal) transmitted from the transmission device 10. As illustrated, a synchronization word and data are arranged in sequence. The frame signal may have an alternative format and may include other elements.

FIGS. 3A-3C show a data structure of a synchronization word. FIG. 3A shows a synchronization word used when binary FSK is used and is comprised of 24 symbols and 24 bits. For example, "1" and "0" correspond to frequency shifts of ±180 Hz. The 8-bit portion "11001100" underlined in FIG. 3A corresponds to the sine waveform portion mentioned above. FIG. 3B shows a synchronization word used when 4-level FSK is used and is comprised of 24 symbols and 48 bits. In 4-level FSK, the four values of symbols "11," "10," "00," and "01" are mapped to "−3," "1," "1," and "3," respectively, of which "−3" and "3" correspond to frequency shifts of ±1800 Hz.

Since "11" and "01" of 4-level FSK correspond to "0" and "1" of binary FSK, the synchronization word of FIG. 3B is substantially identical to the synchronization word of FIG. 3A. These synchronization words are defined in "Frequency Division Multiple Access" section of APCO Project 25. The underlined 16-bit portion "0101111101011111" in FIG. 3B corresponds to the sine waveform portion mentioned above. FIG. 3C shows a synchronization word of FIG. 3B represented in a hexadecimal number. Reference is made back to FIG. 1.

The receiving device 20 receives a frame signal from the transmission device 10. The receiving device 20 is provided with a local oscillator. The reference frequency of the local oscillation signal output from the local oscillator is shifted from the reference frequency of the local oscillation signal output from the local oscillator provided in the transmission device 10. For this reason, a DC offset is included in the signal detected in the receiving device 20. The receiving device 20 performs a process for correcting the DC offset. A description will now be given of this process along with a description of a configuration of the receiving device 20.

Figure 4:
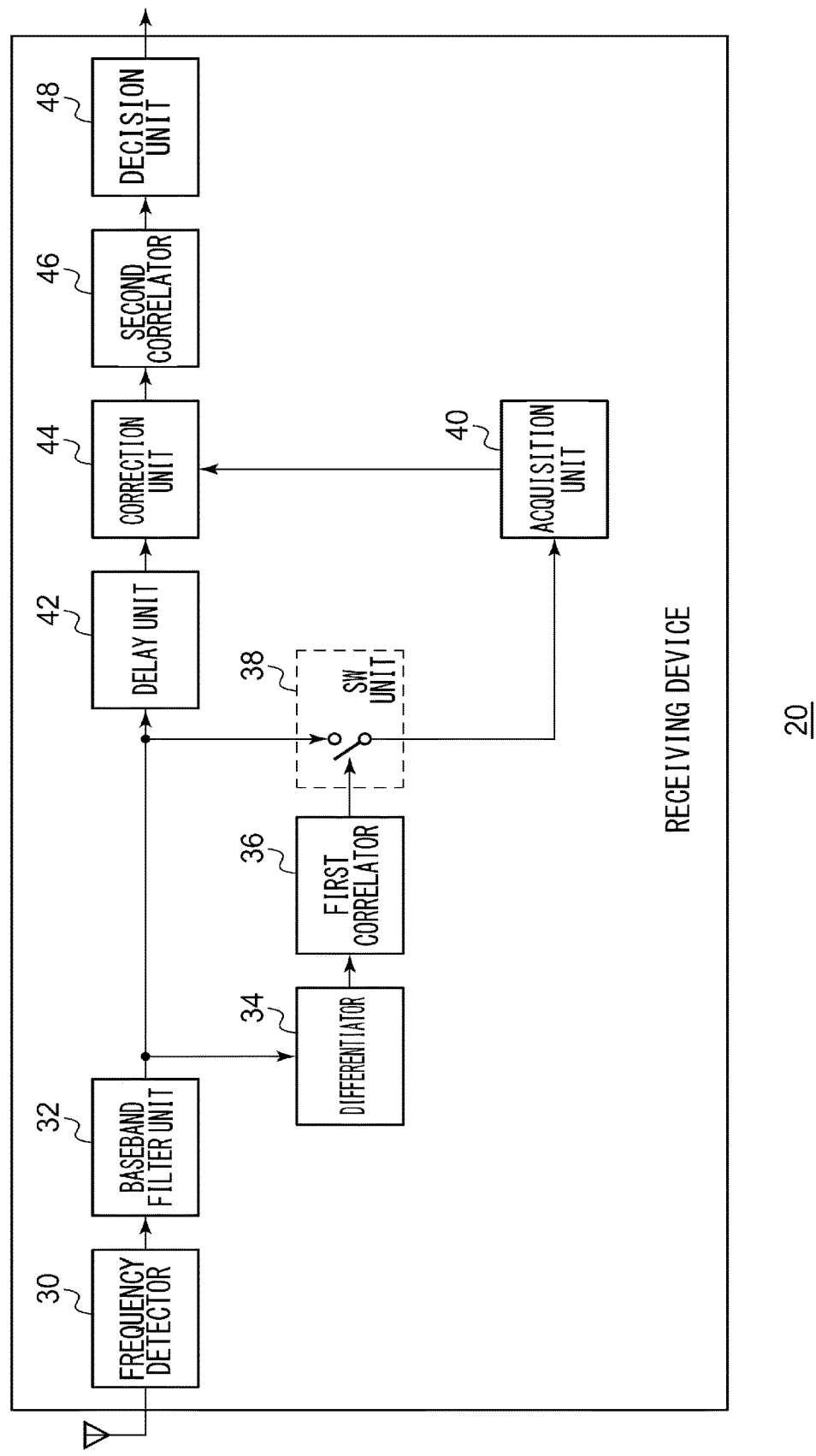
FIG. 4 shows a configuration of the receiving device of FIG. 1.

FIG. 4 shows a configuration of the receiving device 20. The receiving device 20 includes a frequency detector 30, a baseband filter unit 32, a differentiator 34, a first correlator 36, a SW unit 38, an acquisition unit 40, a delay unit 42, a correction unit 44, a second correlator 46, and a decision unit 48.

The frequency detector 30 receives a frame signal received from the transmission device 10 (not shown). The frequency detector 30 is provided with a local oscillator and subjects the frame signal to frequency detection, using, using the local oscillation signal output from the local oscillator. Further, the frequency detector 30 performs analog-to-digital conversion on the frame frame signal subjected to frequency detection at a predetermined sampling rate. The sampling rate is designed to be higher than the symbol rate. As a result, the frequency detector 30 outputs the frame signal subjected to frequency detection and converted into a digital signal (hereinafter, referred to as "received signal," "detection signal") to the baseband filter unit 32. As mentioned above, the detection signal includes a DC offset. The sequence of frequency detection and analog-to-digital conversion in the frequency detector 30 may be reversed.

Figure 5:
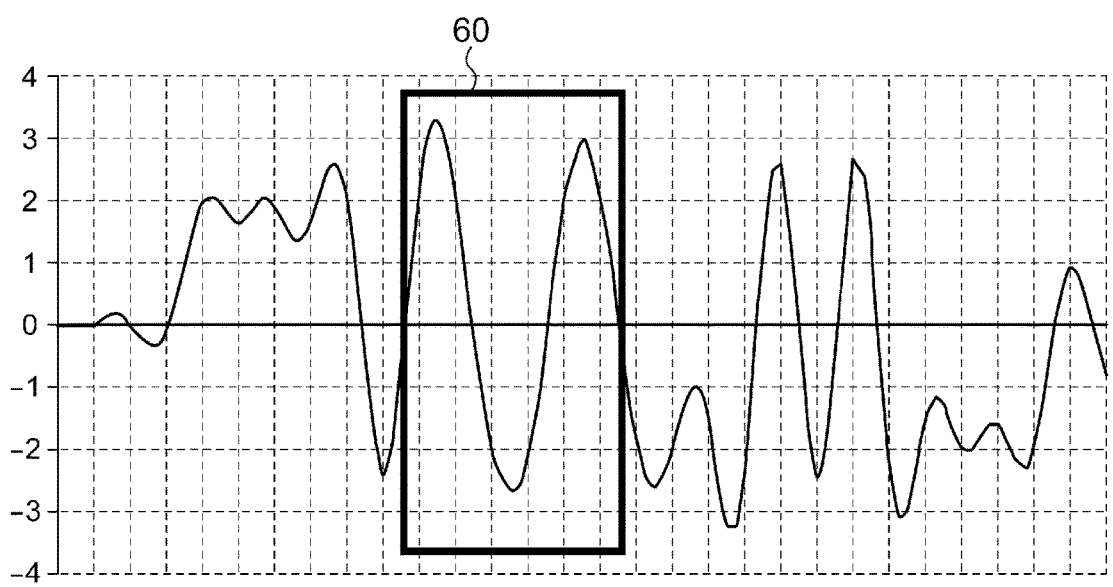
FIG. 5 shows a detection signal output from the baseband filter unit of FIG. 4.

The baseband filter unit 32 receives the detection signal from the frequency detector 30. The portion of the synchronization word in the detection signal includes a sine wave. The baseband filter unit 32 reduces high frequency components included in the detection signal by filtering the detection signal. The baseband filter unit 32 outputs the filtered detection signal (hereinafter, also referred to as "detection signal," "received signal"). FIG. 5 shows a detection signal output from the baseband filter unit 32. The horizontal axis represents time and the vertical axis represents amplitude. The figure shows a synchronization word defined in "FDMA" section of APCO Project 25 mentioned above. The sine waveform portion 60 corresponds to a sine wave at 1200 Hz. The sine waveform has a length of 1.5 cycles, beginning at the origin of amplitude and ending at the origin of amplitude. Reference is made back to FIG. 4.

The differentiator 34 receives the detection signal from the baseband filter unit 32. The differentiator 34 differentiates the detection signal. Differentiation represents calculating a difference between detection signals at an interval of 1 sample. A detailed description will now be given of how the sine waveform in the synchronization word of the detection signal is differentiated. The sine waveform received in the differentiator 34 is given by the following:

$$f(t)=\sin(\omega t)+\alpha \quad (1)$$

where the angular velocity $\omega$ substantially denotes a sampling frequency and $\alpha$ denotes a DC offset.

The result of differentiation of the sine waveform is given by the following:

$$df(t)/dt=d(\sin(\omega t)+\alpha)/dt=\cos(\omega t) \quad (2)$$

As indicated by expression (2), the sine waveform is transformed into a cosine waveform as a result of differentiation. This means deriving a relative amplitude by calculating a difference between detection signals at an interval of 1 sample. The sine waveform and the cosine waveform differ only in phase so that the information component included in the sine waveform is not lost. The differentiator 34 outputs the differentiated detection signal to the first correlator 36.

The first correlator 36 receives the differentiated detection signal from the differentiator 34. The first correlator 36 stores a pattern of cosine waveform as a reference signal and performs a correlation between the differentiated detection signal and the reference signal. The first correlator 36 estimates a time when the sine waveform is included in the detection signal by detecting a peak of the correlation value resulting from correlation.

Figure 6A:
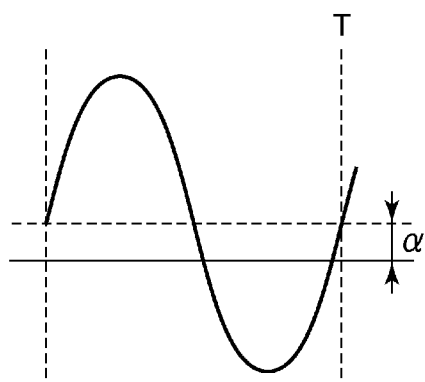
FIGS. 6A-6C show a summary of processing in the receiving device of FIG. 4.
Figure 6B:
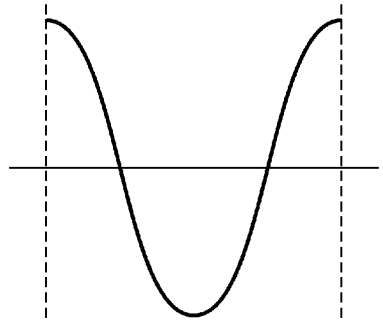
Figure 6C:
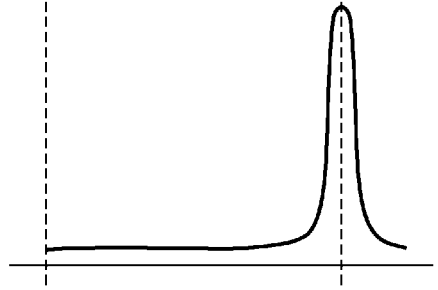
Figure 7A:
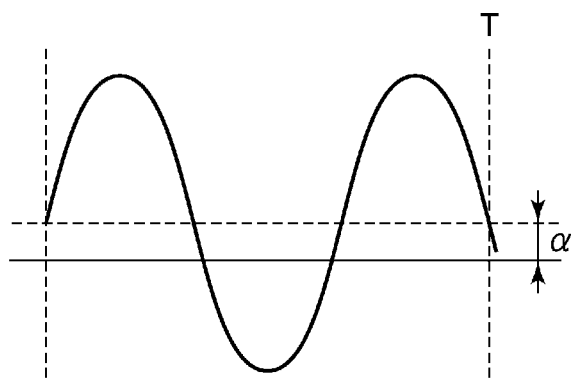
FIGS. 7A-7C show a summary of alternative processing in the receiving device of FIG. 4.
Figure 7B:
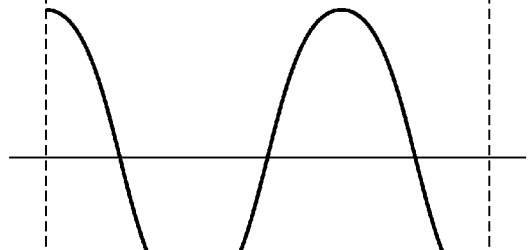
Figure 7C:
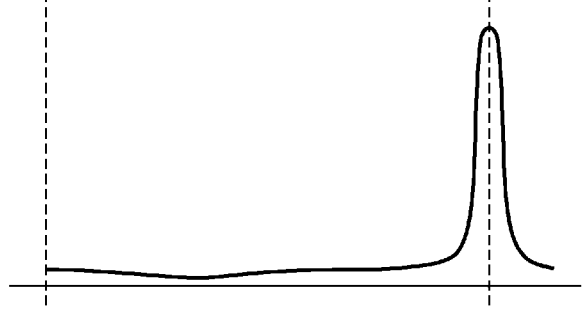

FIGS. 6A-6C show a summary of processing in the receiving device 20. FIG. 6A shows the sine waveform portion in the detection signal, FIG. 6B shows the cosine waveform portion in the differentiated detection signal, and FIG. 6C shows variation in the correlation value resulting from correlation. A match with the reference signal occurs at a time "T." The correlation values is at the maximum at the time "T." At the time "T" when the correlation value is at the maximum, the amplitude of the cosine waveform resulting from the differentiation is at its peak, and the time "T" is when the detection signal should pass the origin. If a DC offset α is included in the detection signal, the value of the detection signal at the time "T" represents in itself the DC offset α. FIGS. 7A-7C show a summary of alternative processing in the receiving device 20. The figures show a case where 1.5 cycles, instead of 1 cycle of FIGS. 6A-6C, are used. FIG. 7C indicates that the reference signal also has a duration of 1.5 cycles. Reference is made back to FIG. 4.

The first correlator 36 switches the SW unit 38 from "off" to "on" when the time T is identified. The SW unit 38 receives the detection signal from the baseband filter unit 32. The SW unit 38 is normally "off" and does not output the received detection signal. The SW unit 38 is switched from "off" to "on" in accordance with an instruction from the first correlator 36. As mentioned above, this is done when the time "T" is identified. When switched to "on," the SW unit 38 outputs the detection signal received concurrently to the acquisition unit 40. When the SW unit 38 outputs the detection signal for one sampling interval, the SW unit 38 is returned to "off."

The acquisition unit 40 receives the detection signal from the SW unit 38 for one sampling interval. This translates into receiving the detection signal at the time "T" when the sine waveform is included in the detection signal, and, more particularly, the time when the sine waveform should pass the origin. The acquisition unit 40 acquires the value of the received detection signal as a DC offset value. In the absence of a DC offset, the value of the detection signal should be "0" at the time "T" when the sine waveform should pass the origin. Therefore, if the value of the detection signal at the time "T" is not "0," the value of the detection signal indicates the DC offset value. The acquisition unit 40 holds the DC offset value until the detection signal is completely output from the baseband filter unit 32, i.e., until the reception of the frame signal in the frequency detector 30 is completed.

The delay unit 42 receives the detection signal from the baseband filter unit 32. The delay unit 42 delays the detection signal for a period of time commensurate to the processing delay in the SW unit 38 and the acquisition unit 40. The delay unit 42 outputs the delayed detection signal (hereinafter, also referred to as "detection signal") to the correction unit 44. The correction unit 44 receives the detection signal from the delay unit 42. The correction unit 44 corrects the detection signal by using the DC offset value from the acquisition unit 40. To describe it more specifically, the correction unit 44 reduces the DC offset value included in the detection signal by subtracting the DC offset value from the detection signal. The correction unit 44 outputs the corrected detection signal (hereinafter, also referred to as "detection signal") to the second correlator 46.

The second correlator 46 receives the detection signal from the delay unit 42. The second correlator 46 stores a synchronization word and performs a correlation between the detection signal and the synchronization word. The second correlator 46 establishes frame and symbol timing synchronization by detecting a peak of the correlation value resulting from correlation. The second correlator 46 outputs the data portion of the detection signal for which timing synchronization is established to the decision unit 48. The decision unit 48 receives the data portion from the second correlator 46. The decision unit 48 acquires the data by subjecting the data portion to a decision process. A publicly known technology may be used for the decision process and a description thereof is omitted.

The features are implemented in hardware such as a CPU, a memory, or other LSI's of a computer, and in software such as a program loaded into a memory, etc. The figure depicts functional blocks implemented by the cooperation of these elements. Therefore, it will be obvious to those skilled in the art that the functional blocks may be implemented in a variety of manners by hardware only, by software only, or by a combination of hardware and software.

Figure 8:
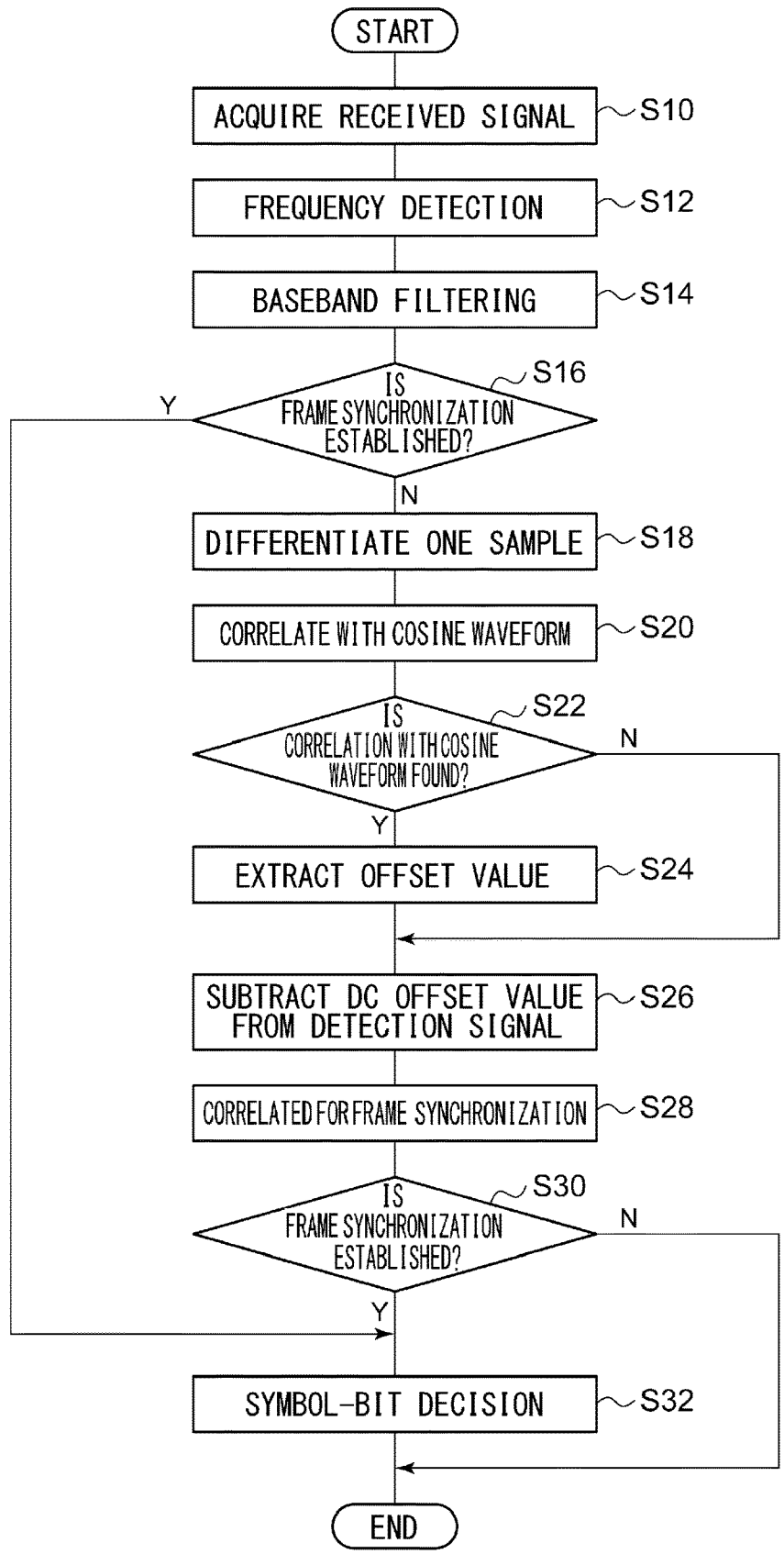
FIG. 8 is a flowchart showing the steps for reception in the receiving device of FIG. 4.

A description will be given of the operation of the receiving device 20 with the above-described configuration. FIG. 8 is a flowchart showing the steps for reception in the receiving device 20. The frequency detector 30 acquires a received signal (S10) and performs a frequency detection process (S12). The baseband filter unit 32 subjects a detection signal to a baseband filter process (S14). If frame synchronization is not established (N in S16), the differentiator 34 performs a differentiation process on one sample (S18). The first correlator 36 performs a correlation process with a cosine waveform (S20). If a correlation with the cosine waveform is found (Y in S22), the acquisition unit 40 extracts a DC offset value (S24).

If a correlation with the cosine waveform is not found (N in S22), step 24 is skipped. The correction unit 44 subtracts the DC offset value from the detection signal (S26). The second correlator 46 performs a correlation process for frame synchronization (S28). Once frame synchronization is established (Y in S30), the decision unit 48 performs a decision unit for turning a symbol into a bit (S32). If frame synchronization is not established (N in S30), step 32 is skipped. If frame synchronization is established (Y in S16), step 18 through step 30 are skipped.

According to the embodiment, a differentiated detection signal and a cosine waveform are correlated. Therefore, the time when the detection signal includes a sine waveform is detected regardless of a DC offset. Since the value of the detection signal at a time when the detection signal includes a sine waveform is extracted, the DC offset value is acquired. Further, the DC offset value is acquired based on the results of differentiation and correlation, the period of time required to acquire the DC offset value is reduced. In further accordance with the embodiment, the detection signal is corrected by the DC offset value thus acquired. Therefore, the time required to correct the DC offset is reduced.

Since the value of the detection signal occurring at a time when the detection signal includes a sine waveform is acquired, the DC offset can be canceled regardless of the amount of DC offset. Since the DC offset is canceled regardless of the amount of DC offset, the time required to acquire synchronization is reduced. Since the sine waveform in the synchronization is targeted for differentiation, the synchronization is captured accurately without causing permanent degradation. Differentiation is performed merely by subtracting the value from that of the previous sample so that load is reduced.

Since the value of the detection signal is acquired as the DC offset value at a time when the sine waveform should pass the origin, the precision of DC offset value is improved. Since the value of the detection signal is acquired as the DC offset value at a time when the sine waveform should pass the origin, the process is simplified. Since the offset value is held until the reception of a signal is completed, the process is continued accurately even when a sine waveform is included in the data.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An offset value correction device comprising:
baseband filter that inputs a received signal including a sine waveform at least in a portion of the received signal;
a differentiator that differentiates the received signal input to the baseband filter;
a correlator that correlates the received signal differentiated in the differentiator and a cosine waveform;
an acquirer that acquires a value of the received signal input to the baseband filter as an offset value, at a time estimated based on a result correlation in the correlator, at a time when the received signal received in the baseband filter includes a sine waveform, and at a time when the sine waveform should pass an origin; and
a corrector that corrects the received signal input to the baseband filter in accordance with the offset value acquired in the acquirer.

2. The offset value correction device according to claim 1, wherein the acquirer holds the offset value until input of the received signal to the baseband filter is completed.

3. An offset value correction method comprising:
inputting a received signal that includes a sine waveform at least in a portion of the received signal;
differentiating the received signal;
correlating the received signal differentiated and a cosine waveform;
acquiring a value of the received signal as an offset value, at a time estimated based on a result of correlation, at a time when the received signal includes a sine waveform, and at a time when the sine waveform should pass an origin; and
correcting the received signal in accordance with the offset value.

4. The offset value correction method according to claim 3, wherein
the acquiring includes holding the offset value until input of the received signal to the baseband filter is completed.

* * * * *